(12) United States Patent
Kinugawa et al.

(10) Patent No.: US 7,395,213 B2
(45) Date of Patent: Jul. 1, 2008

(54) METHOD, APPARATUS AND SYSTEM FOR DOING RENTAL SERVICE OF CONSTRUCTION MACHINE

(75) Inventors: Hideki Kinugawa, Hiroshima (JP); Naotake Numata, Tokyo (JP); Nobuhiro Shirasawa, Tokyo (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 1291 days.

(21) Appl. No.: 09/973,729

(22) Filed: Oct. 11, 2001

(65) Prior Publication Data

US 2002/0052813 A1 May 2, 2002

(30) Foreign Application Priority Data

Nov. 1, 2000 (JP) ............................. 2000-334563

(51) Int. Cl.
*G06Q 99/00* (2006.01)
(52) U.S. Cl. .............................................. 705/1; 705/14
(58) Field of Classification Search .................. 705/14, 705/1
See application file for complete search history.

(56) References Cited

FOREIGN PATENT DOCUMENTS

EP    0 989 525 A2    3/2000

OTHER PUBLICATIONS

"Budget Aims for Hole in One With Innovative New Frequent Renter Program Linked to Callaway Gold Company", PR Newswire, Mar. 30, 1998, 4 pages.*
"Cell phone users can roll minutes over", Atlanta Journal Constitution, May 20, 2000, 2 pages.*

* cited by examiner

*Primary Examiner*—Dennis Ruhl
(74) *Attorney, Agent, or Firm*—Oblon, Spivak, McClelland, Maier & Neustadt, P.C.

(57) ABSTRACT

This invention relates to a method for carrying out, using control means capable of gathering operating information of one or more construction machines to be rented to one or more renters, a service to renters according to the operating information, wherein the control means calculates the point number for service for giving back the profit to the renters on the basis of an evaluation standard preset with respect to the construction machines from the operating information, and totals the point number calculated every renter to present it.

7 Claims, 6 Drawing Sheets

METHOD, APPARATUS AND SYSTEM FOR DOING RENTAL SERVICE OF CONSTRUCTION MACHINE

BACKGROUND OF THE INVENTION

1. Field of the Invention

The present invention relates to rental service method, apparatus and system for a construction machine.

2. Description of the Related Art

Construction machines such as hydraulic excavators used in a work site for construction are greatly different in necessary kind of machines or specification according to the kinds of work. Accordingly, it is more economical to rent construction machines from rental companies rather than purchasing them. Therefore, recently, rental service of construction machines has been rapidly prevailed.

FIG. 2 is a schematic view showing a flow of construction machines for rent. In the figure, a rental company (including affiliated companies thereof) R purchases and owns construction machines m1, m2 and m3 from a plurality of construction machine manufacturers M1, M2 and M3 in order to serve wide needs of a construction company U as end user. Thereby, a so-called group rental is constituted. Suppose that the construction company U selects, for rent, for example, the construction machine m1 made of M1 out of a plurality of construction machines from the rental company R. The president u0 of the construction company U causes operators u11, u12 and u13 to operate the construction machine m1 at the spot through a site foreman (a supervisor) u1. On the other hand, the construction company U pays a rental fee c of the construction machine m1 to the rental company R.

In this case, it is difficult for the rental company R to grasp accurately how the construction machine m1 is operated. Therefore, the rental fee c has been set according to a rental period of the construction machine m1. For example, in a case of a hydraulic excavator of 20-ton class, if the fee is set to ¥20,000/day, the rental fee for 10 days will be ¥20,000×10 days=¥200,000.

However, it cannot be denied to be unfair that even if the machine m1 is rarely operated or fully operated, the same rental fee c is charged. On the other hand, the machine m1 gradually becomes consumed due to its continuous operation, and finally lifetime of the machine m1 ends. The rental company R is to purchase a new construction machine m1 from the construction machine maker M1. Normally, the lifetime depends on the operating state of the machine m1. Accordingly, it is contemplated that the rental company gives back any profits to the construction company U in consideration of the lifetime difference of the machine m1. However, in the existing rental method, unfair feeling regarding the rental fee is not yet overcome. Therefore, it was difficult to create motivation that a person who has authorization to select a construction machine to be rented (a site foreman u1) wants to select that construction machine at any cost.

SUMMARY OF THE INVENTION

It is an object of the present invention to provide method, apparatus and system for doing a rental service of a construction machine wherein by giving back the lifetime difference of a construction machine to be rented as a service to a rental client, unfair feeling regarding a rental fee is eliminated, and which is able to create motivation that a person who has authorization to select a construction machine to be rented wants to select that construction machine at any cost.

The method for doing a rental service of a construction machine according to the present invention has the following constitution.

Operating information of one or more construction machines to be rented to one or more renters is collected by information control means. Next, point number for service to the renters is calculated on the basis of an evaluation standard preset with respect to the construction machine by the information control means. Then, the point number is accumulated every renter and presented to the renter.

In this case, it is possible to cause the renter who receives the presentation of the point number to create expecting feeling that any service according to the total value of the point number can be received. In a case where despite renting a construction machine, the construction machine is not so much operated, its consumed degree becomes relatively small. Therefore, it is reasonable that some kind of profit be given back to the renter. It is possible to enhance the repeating rate of a renter, by presentation of some kind of service, to increase rental sales. Further, it can be expected by the presentation of the present service, even the renter diligently stops the engine. Accordingly, it is possible to eliminate wasteful use of fuel to prevent generation of $CO_2$.

DESCRIPTION OF THE PREFERRED EMBODIMENTS

Figure 1:
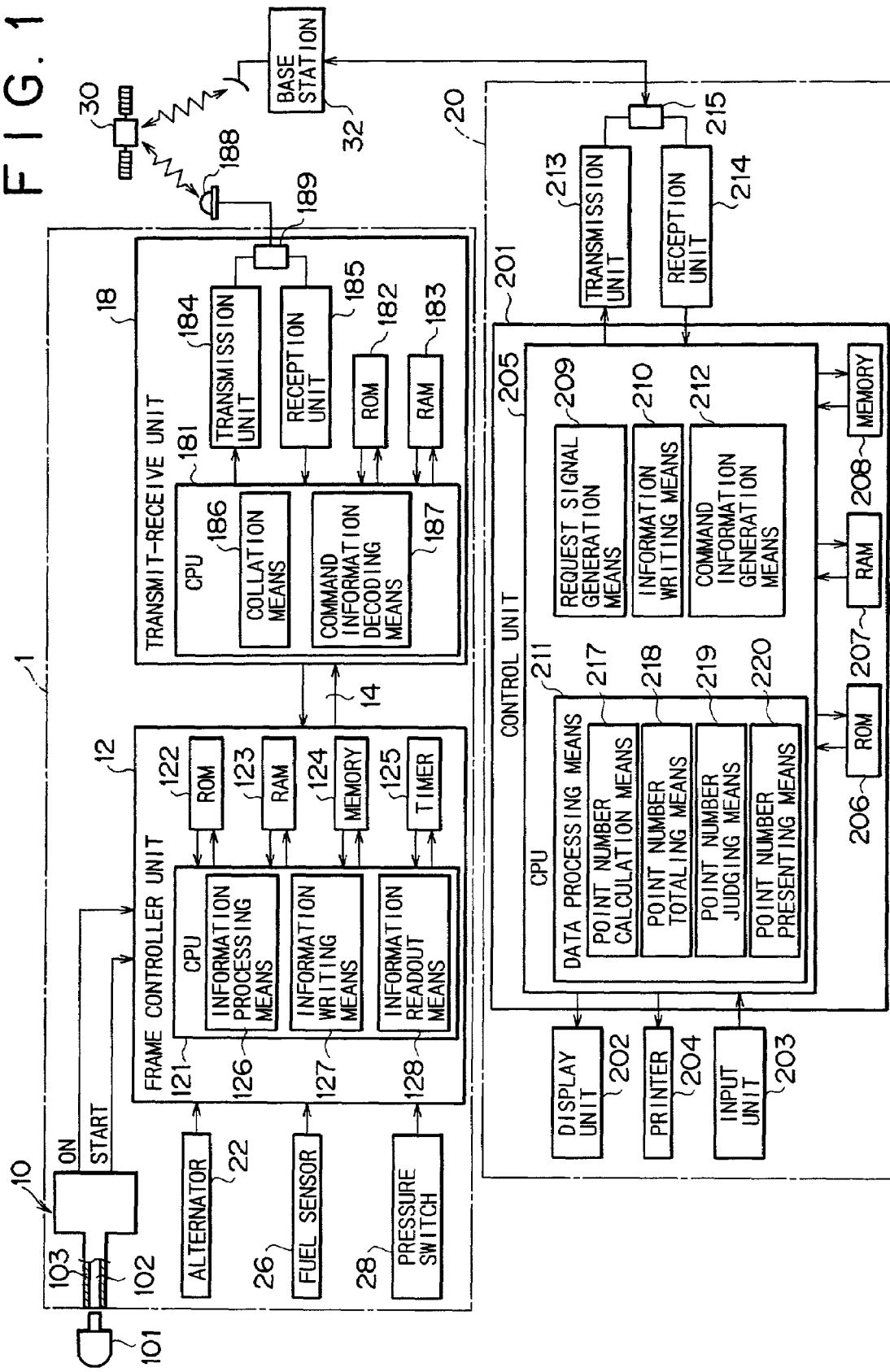
FIG. 1 is a view showing the constitution of a system provided with an apparatus to which is applied a rental service method of a construction machine according to one embodiment of the present invention.

The present invention will be described hereinafter on the basis of embodiments shown in the drawings. This is merely one embodiment of the present invention and is not limited thereto.

FIG. 1 is a view showing the schematic constitution of a system to enable realization of a rental service method of a construction machine according to one embodiment of the present invention. The present system comprises, for example, a construction machine 1 such as a hydraulic excavator to be rented from a rental source, such as a rental company (including its affiliate companies) and so on, and an apparatus for transmit-receiving information with respect to the construction machine through a communication satellite 30 and a base station (the earth station) 32. As this apparatus, there is illustrated a control computer 20 as information control means owned by a rental company.

Figure 2:
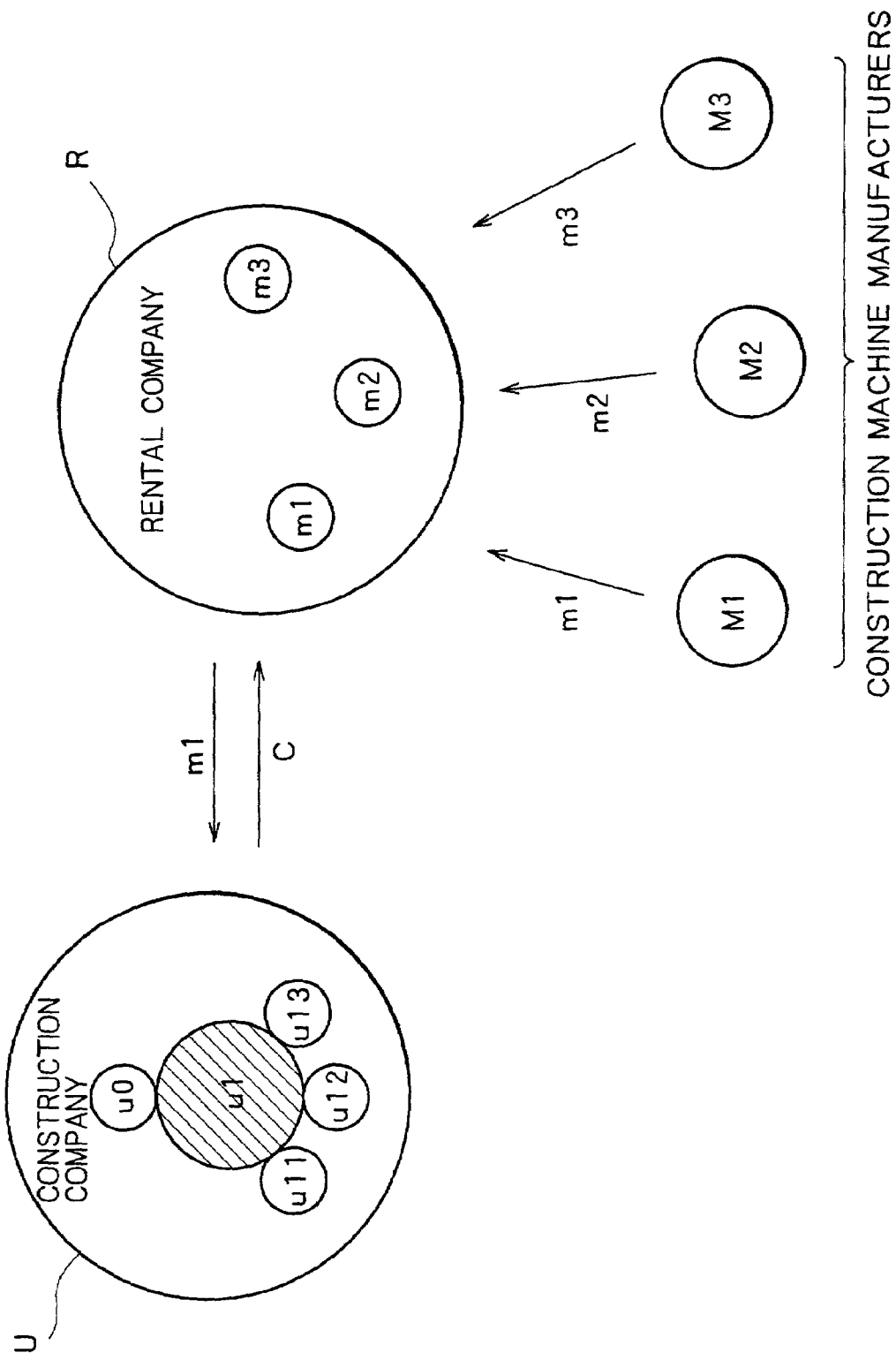
FIG. 2 is a schematic view showing a flow of a construction machine to be rented according to one embodiment of the present invention.

A flow of the construction machine for rent is as shown in FIG. 2. A constitution of a so-called group rental system is employed. The renter is a person who has authorization to select the construction machine 1 to be rented, for example, a site director (a site foreman) u1. This site director u1 may be allowed to serve jointly with a president u0 of a construction company U receiving a rental service of the construction machine 1 or operators u11, u12 and u13. The rental source may be one or a more sources. The construction machine 1 may be one or more ones.

The construction machine 1 comprises a key switch unit 10 on which a start key 101 for starting an engine is mounted, a frame controller unit or a machine body controller 12 into which is input a signal output from the unit 10, and a transmit-receive unit 18 connected to the controller unit 12 by a connecting cable 14 to transmit-receive information with respect to the base station 32 through the satellite 30.

The unit 10 has a key hole 102 into which a start key 101 is inserted. The unit 10 is provided with a key switch 103 capable of switching a position from a "LOCK" position which is a position into which the start key 101 may be inserted or removed to an "ON" position and a "START" position.

The frame controller unit 12 comprises a CPU (Central Processing Unit) 121 for carrying out predetermined calculation and control processing; a ROM (Read Only Memory) 122 in which a predetermined control program is stored; a RAM (Random Access Memory) 123 for temporarily storing process data; an electrically rewritable memory 124 such as an EEPROM (Electrically Erasable Programmable Read Only Memory) or a flash RAM for storing operating information described later (hereinafter called operating time or the like) such as operating time, a load ratio and used time of special specification; and a timer 125 having a calendar function for carrying out timer for presenting date and time information.

The CPU 121 comprises information processing means 126 for calculating operating time or the like by carrying out predetermined data processing, information writing means 127 for writing operating time or the like and data and time information calculated into the memory 124, and information readout means 128 for reading the operating time written into the memory 124, for example, at the time of termination of a rental period. However, the readout period can be set to a suitable period by a command signal from the control computer 20 described later if it is within a rental period of the construction machine 1. In that case, this can cope with accumulating of operating time or the like for a rental period on the control computer 20 side.

Further, to the frame controller unit 12 are connected a key switch unit 10 on which the start key 101 is mounted, an alternator 22 constituting a power supply unit of the construction machine 1 together with a battery, a fuel sensor 26 installed within a fuel tank in which fuel such as gasoline or light oil is stored, and a pressure switch 28 installed in an operating circuit for operating an attachment (for example, a breaker) of special specification. Signals output therefrom are input into the controller unit 12. Among them, the key switch unit 10, the alternator 22, the fuel sensor 26, the pressure switch 28 and the information processing means 126 constitute a detector as detection means.

When the start key 101 is inserted into the key hole 102, and the key switch 103 is turned from the "LOCK" position to the "START" position through the "ON" position, the frame controller unit 12 causes the start motor to drive to start the engine of the construction machine 1. On the other hand, the controller unit 12 controls operation of the whole body of the construction machine 1. Further, at the same time when the engine starts, to the controller unit 12 are input predetermined signals from the alternator 22, the fuel sensor 26 and the pressure switch 28. These input signals are subjected to predetermined data processing by the information processing means 126. The operating time or the like resulting from the data processing is stored in the memory 124 corresponding to the date and time information output from the timer 125. As a consequence, operating information for calculating the point number with respect to the construction machine can be gathered.

That is, an operation start time is defined as a time at which a "START" signal is output from the key switch 103, and the engine is started, and a generation signal is output from the alternator 22. Further, an operation stop time is defined as a time at which the engine is stopped so that an "ON" signal output from the key switch 103 disappears, and a generation signal output from the alternator 22 disappears. A difference between the operation start time and the operation stop time is calculated as operation time, and accumulated value thereof is stored.

The load ratio is calculated from a signal output from the fuel sensor 26. That is, a signal proportional to a fuel consumption quantity is output from the fuel sensor 26, and a fuel quantity consumed per unit time is calculated from an output value on the basis of the signal. The load ratio of the engine is expressed by the ratio of a fuel consumption quantity per unit time at a rated load measured in advance by the engine makers to the fuel consumption quantity calculated. In the present embodiment, an average value within a predetermined period of the load ratio of the engine is stored as the load ratio.

Further, used time of special specification is measured on the basis of a signal output from the pressure switch 28. That is, time at which an "ON" signal (a signal output when a breaker or the like is operated) output from the pressure switch 28 is output is counted as used time of the special specification, and stored as an accumulated value.

The operating time stored in the memory 124 is read from the memory 124 when a rental period terminates, and transmitted to the transmit-receive unit 18 through a connecting cable 14.

The transmit-receive unit 18 comprises a CPU 181 for carrying out predetermined calculation and control processing, a ROM 182 in which is stored identification information (ID code) showing a predetermined control program and the type and machine number of the construction machine 1, a RAM 183 for temporarily storing processing data, a transmission unit 184 as transmission means for transmitting operating time or the like read from the memory 124 together with the identification information read from the ROM 182 to the base station 32 though the communication satellite 30, and a reception unit 185 for receiving the identification information and command information transmitted through the base station and the communication satellite 30 from the control computer 20.

Further, the CPU 181 is provided with collation means 186 for collating the identification information transmitted from the control computer 20 with the identification information stored in the ROM 182 to discriminate coincidence or non-coincidence, and command information decoding means 187 for decoding the command information transmitted from the computer 20 when the identification information is coincided. Further, an antenna 188 for carrying out communication with respect to the satellite 30 is connected to the transmission unit 184 and the reception unit 185 through a duplexer 189. The operating time or the like stored in the memory 124 is erased after having been transmitted to the base station 32.

The control computer 20 is constituted, for example, by a personal computer. The control computer 20 (hereinafter sometimes referred to as control PC) receives operating time or the like of the construction machine 1 transmitted from the base station 32 whereas processes the received information to control the construction machine 1. The control PC comprises a control unit 201 for controlling operation of the whole control PC 20, a display unit 202 comprising a monitor such as CRT indicative of the data processed result, an input unit 203 such as a keyboard for inputting control signal or the like to the control unit 201, and a printer 204. The input unit 203 has a function for inputting standard operating time, standard load ratio, standard used time, rental period and the like for calculating the point number described later, and name of site director, place to be presented to him and the like for accumulating and presentating the point number. The standard operating time, the standard load ratio, the standard used time, the rental period, the name, the place and so on are overall hereinafter called standard time or the like.

The control unit 201 comprises a CPU 205 for carrying out predetermined calculation and control processing, a ROM 206 in which are stored a predetermined control program, identification information and an evaluation standard for calculating the point number described later, a RAM 207 for temporarily storing process data, and a rewritable memory 208 such as EEPROM or flash RAM for storing the identification information and operating time or the like of the construction machine 1 to be controlled. The memory 208 has a storage area for storing the standard operating time or the like input in the input unit in connection with the identification information and the evaluation standard.

Further, the CPU 205 comprises request signal generation means 209 for requesting transmission of the identification information and the operating time or the like of the construction machine 1 stored in the memory (not shown) within the base station 32, information writing means 210 for writing the identification information and the operating time or the like transmitted into the memory 208, data processing means 211 for carrying out predetermined data processing with respect to the operating time or the like written in the memory 208, and command information generation means 212 for commanding transmission of the operating time or the like stored in the memory 124 with respect to the construction machine 1.

The data processing means 211 comprises: point number calculation means (calculation means and adjustment means) 217, as the predetermined data processing, for calculating the point number for service for the purpose of returning the profit to a site director specified by the identification information on the basis of the evaluation standard with respect to the construction machine 1 from the received operating time or the like, and carrying out the adjustment of the point number according to a stock quantity at the time of calculation; point number totaling means 218 for totaling the point number calculated every site director and storing a total value of the calculated point number in the memory 208 in connection with the site director; point number judging means 219 for judging whether or not the total value of the point number every site director exceeds a predetermined value; and point number presenting means (presentation means) 220 for presenting the total value by the display unit 202 or the like when judgment is made that the total value exceeds the predetermined value.

The standard operating time or the like stored in the storage area of the memory 208 is one of concrete examples of the evaluation standard, using the input unit 203. Changing of setting the evaluation standard can be made corresponding to any of the following point number calculation methods. Accordingly, in the point number calculation means 217, the rental company can apply its desired point number calculation method.

(1) Point number calculation method from the operating time

Let Td be the actual operating time, Ts be the standard operating time a day, and D be the rental period (days), and if a relation therebetween is Td<Ts×D, the point number Ph relating to the operating time is given by the following equation.

$$Ph = (Ts \times D - Td) \times Kh \quad (1)$$

Wherein Kh is constant, which is set in advance. For example, suppose that Ts=4 hours, D=5 days, and Kh=10, and Td=16 hours, then Ph=40, and this means that 40 points are calculated.

It is preferable that the point number is adjusted according to the stock conditions of construction machines. For example, in a case where there are many stocks of construction machines to be rented, adjustment of the point number may be made so that Kh for a campaign period is set to Kh=20, and the point number is twice more than usual. In a case where there are many stocks as described above, accumulated ratio of the point number is increased to promote a rental service business of construction machines whereby the stock quantity can be made to be appropriate.

In the point number calculating method from the used time of special specification, the used time of special specification and the standard used time can be used in place of the actual operating time and the standard operating time.

In a case where the operating information is made to be the operating time of the construction machine, the point number in inverse proportion to the operating time is calculated. Therefore, the reasonable service can be provided. In this case, as the evaluation standard, only in a case where for example, the actual operating time is less than the standard operating time, the point number in proportion to the value obtained by subtracting the actual operating time from the standard operating time may be calculated.

(2) Point number calculating method from the load ratio.

Let N be the actual load ratio, Ns be the standard load ratio, and D be the rental period (day), and if a relation is N<Ns, the point number Pf relating to the load ratio is given by the following equation, $$Pf = (Ns - N) \times D \times Kf \quad (2)$$

Wherein Kf is constant, which is set in advance. For example, suppose that Ns=60%, D=5 days, and Kf=0.2, and N=50%, then Pf=10, and this means that 10 points are calculated for a renter. In a case where there are many stocks of construction machines to be rented, adjustment of the point number may be made so that Kf for a campaign period is set to Kf=0.4, and the point number is twice more than usual.

Meaning of calculating the point number from the load ratio is as follows. Even if the operating time is the same, one hour, between a construction machine used under the condition that the frequency of the engine is low and the load ratio is low and a construction machine used under the condition that the engine is at full rotation and the load ratio is high, there is a difference in the consuming degree of the construction machine, resulting in a difference in lifetime of the construction machine. So, in a case where the operating information is made to be the load ratio of the construction machine, the point number in inverse proportion to the load ratio is calculated. Therefore, the reasonable service caused by giving back the profit as the point number is provided. In this case, as the evaluation standard, only in a case where for example, the actual load ratio is smaller than the standard load ratio, the point number in proportion to the value obtained by subtracting the actual load ratio from the standard load ratio may be calculated and obtained.

Further, the purchasing price of a construction machine with special specification is higher than that of a standard machine. Therefore, it is necessary to take the used time of special specification into consideration. So, suppose that the construction machine to be rented has the special specification, and the operating information is the used time of the special specification. In this case, since the point number is calculated in inverse proportion to the used time of the special specification, the reasonable service caused by giving back the profit as the point number is provided. In this case, as the evaluation standard, only in a case where for example, the actual load ratio is smaller than the standard load ratio, the point number in proportion to the value obtained by subtracting the actual load ratio from the standard load ratio may be calculated and obtained.

(3) Calculating method for the total point number P

The total point number P is given by the following equation.

$$P=Ph+Pf \quad (3)$$

In the above-described example, the total point number is 50 points since Ph=40 and Pf=10.

Further, to the CPU 205 are connected a transmission unit 213 for transmitting command information to the base station 32, and a reception unit 214 as receiving means for receiving identification information and the operating time or the like transmitted from the base station 32. The CPU 205 is connected to be communicable to the base station 32 through a DSU (Digital Service Unit) 215.

Figure 3:
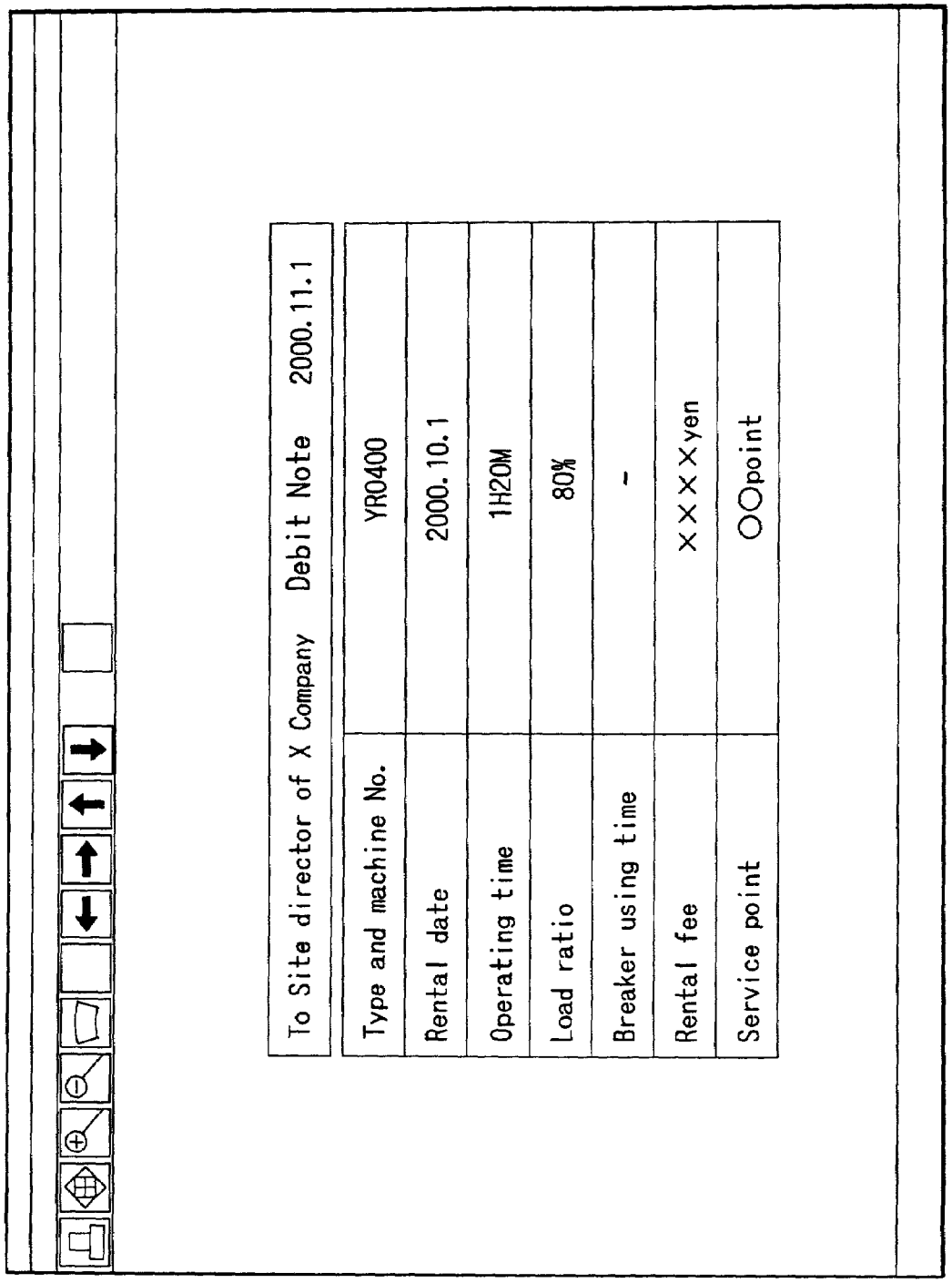
FIG. 3 is a schematic view showing a format example for presenting service points according to one embodiment of the present invention.

In the present embodiment, as mentioned above, the operating time or the like, with respect to the construction machine 1 to be rented, is once stored in the memory 124 and transmitted to the control PC 20 through the satellite 30. In the PC 20, as receiving information, the operating time or the like obtained from the construction machine 1 at the end of a rental period is applied to the equations (1), (2) and (3) described above. Thereby, the point number of the construction machine 1 is calculated and obtained. Then, the total point number every site director is obtained. A total value of the total point number is stored in the memory 208 in connection with the site director. And, when the total value every site director reaches a predetermined value (for example, 100 points), its total value is presented to look at. As for a method for presenting it, the value is displayed on a monitor screen of the display unit 202 in the format as shown in FIG. 3, for example. FIG. 3 shows an example of a bill indicating the point number together with a demand of a rental fee in a case where a rental period is one day. The information of the display screen is printed out by a printer 204. The rental company sends the printed out format to the site director so that several kinds of privileges ranked according to the total value (for example, such as things of value, a travel ticket or the like) is presented to the site director. As for the format, a predetermined format determined every rental company not limiting to that shown can be also used.

In a case where a rental source such as a site director seeking for a rental service has a terminal having a receiving device capable of being communicated with the control PC 20, as the method for presenting the point number to the rental source, an electronic transmission by way of an e-mail or the like may be employed. If an e-mail address note of clients is prepared in advance and electronic transmission is carried out every time the point number is updated, transmission of the point number can be done quickly. Thereby, it is possible to urge the rental source the succeeding order.

The communication satellite 30 is a low orbit round satellite launched into the polar orbit in the vicinity of the altitude of 780 km, and transmits the operating time or the like of the construction machine 1 transmitted from the transmission unit 184 through the antenna 188 to the base station 32 after once having received it. The base station 32 stores the operating time or the like of the construction machine transmitted through the satellite 30 in the memory assigned to the PC 20.

Figure 4:
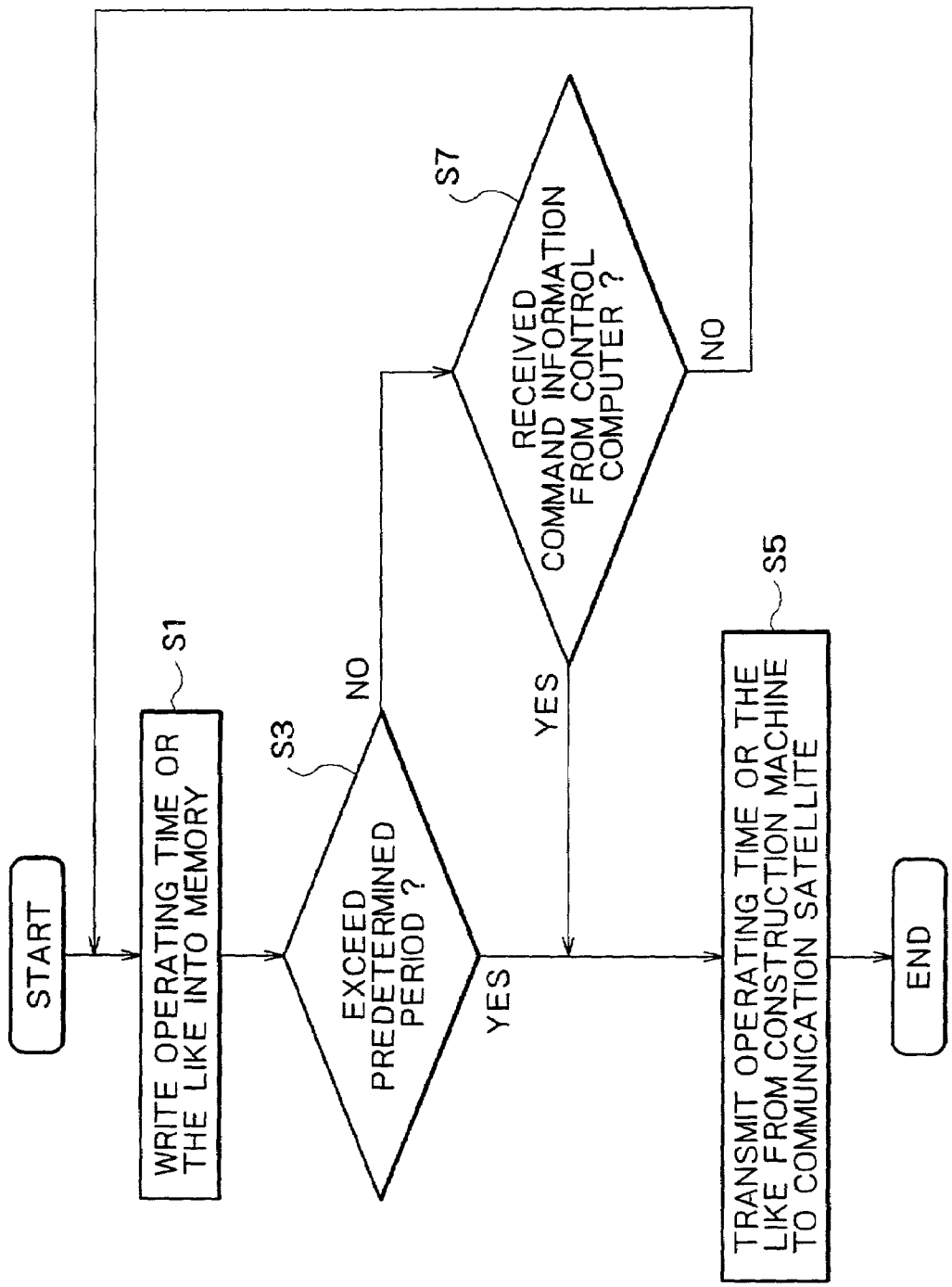
FIG. 4 is a flow chart for explaining transmit-receive operation on the construction machine side of the system shown in FIG. 1.

Next, the transmit-receiving operation of information on the construction machine 1 side in the above system will be explained with reference to a flow chart shown in FIG. 4.

When the engine of the construction machine 1 is started, an output signal from the alternator 22 or the like is taken into the machine body controller 12, and written together with data and time information form the timer 125 into the memory 124 by the information writing means 127 as the operating time or the like (Step S1).

The operating time or the like can be obtained on the basis of the output signals from the key switch unit 10, the alternator 22 and so on. For example, the time at which a "START" signal is output from the key switch 103, and the engine is started to output a generation signal from the alternator 22 is defined as an operation start time. The time at which an "ON" signal output from the key switch 103 disappear, and the generation signal output from the alternator 22 disappears is defined as an operation stop time. A difference between the operation start time and the operation stop time is calculated by the information processing means 126 as the operating time, and its total value is written into the memory 124.

Next, the operating time or the like stored in the memory 124 by the information readout means 128 is readout, for example, at the end of a rental period (Step S3). It is transmitted to the satellite 30 through the antenna 188 by the transmission unit 184 (Step S5).

The operating time or the like transmitted to the satellite 30 is transmitted to the base station 32 and stored in the memory of the base station 32. The operating time or the like is normally transmitted under the condition that data is compressed, and is released as it was before when taken into the PC 20.

When the determination is denied in Step S3, in other words, when not exceeding a predetermined period, discrimination is made whether or not command information from the PC 20 to the effect that the operating time or the like stored in the memory 124 is read and transmitted to the satellite 30 is received (Step S7). This discrimination is executed by the command information decoding means 187, but in the discrimination, whether or not identification information (A) transmitted from the PC 20 coincides with identification information (B) stored in the ROM 182 is collated by the collation means 186. Only in a case where both (A) and (B) of the information are coincided, the discrimination operation is executed.

When the judgment is affirmed in Step S7, the next step transfers to Step S5. On the other hand, when the judgment is denied in Step S7, the step returns to Step S1 where the thereafter operation is executed repeatedly. When, in Step 5, the operating time or the like is transmitted to the satellite 30, the operating time or the like stored in the memory 124 is erased.

Figure 5:
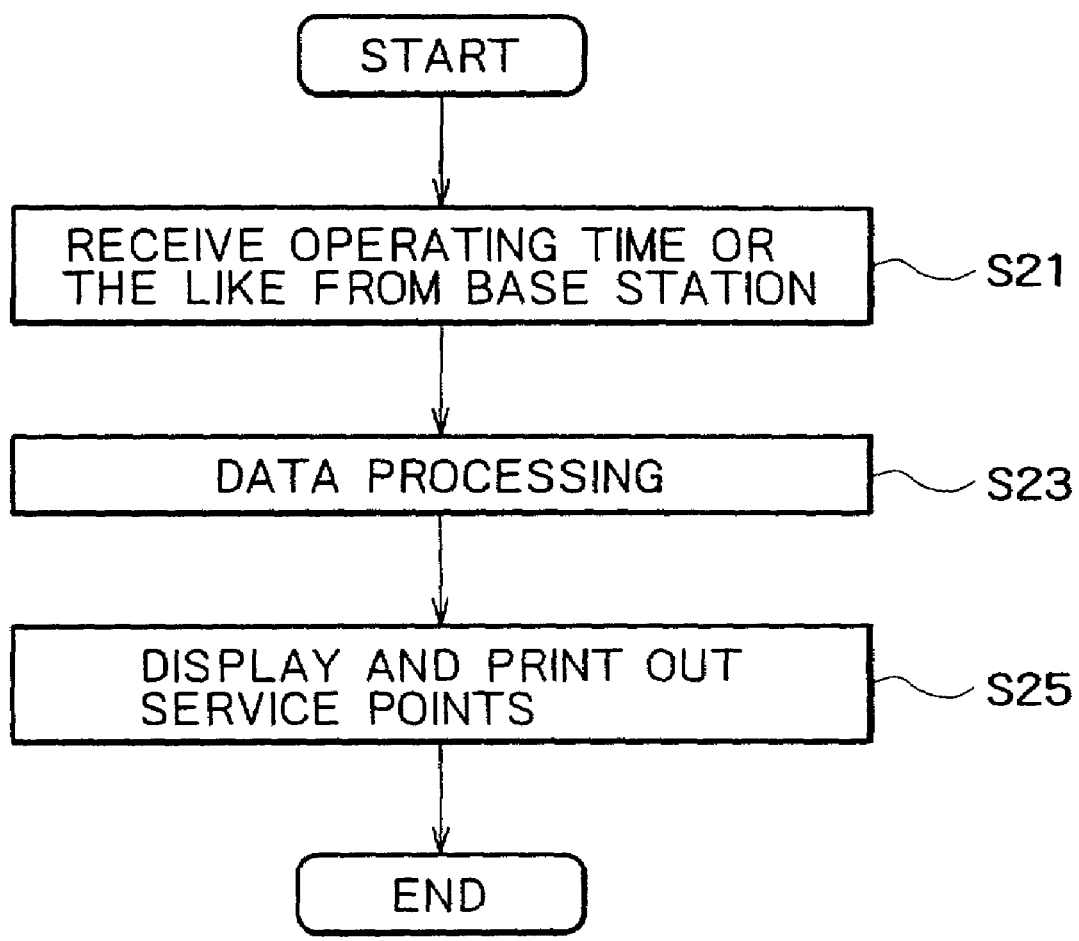
FIG. 5 is a flow chart for explaining transmit-receive operation on the control computer side of the system shown in FIG. 1.

Next, the transmit-receiving operation of information on the PC 20 side in the above system will be explained with reference to a flow chart shown in FIG. 5.

First, the operating time or the like stored in the memory of the base station 32 is automatically received by the control PC

20 (Step S21). A request signal output from the request signal generation means 209 is transmitted to the base station 32 by operation of the input unit 203 from the transmission unit 213 as necessary. The operating time or the like stored in the memory of the base station 32 is readout in response to the request signal. The read operating time or the like is transmitted to the PC 20 from the base station 32. The transmitted operating time or the like is received by the reception unit 214 and written into the memory 208 by the information writing means 210 together with identification information therefor.

The operating time or the like written into the memory 208 is subjected to the above-mentioned predetermined data processing by the data processing means 211 (Step S23). As a result, the point number based on the operating time or the like is calculated and obtained. A total value of the point number as the result of processing is stored in the memory 208 in connection with the site director. When the total value exceeds a predetermined value, the total value is displayed on the monitor screen of the display unit 202. It is printed out on a recording sheet by the printer 204 at need (Step S25). The operating time or the like written previously into the memory 208 is held or kept till an erasing instruction signal is output by the operation of the input unit 203 at the end of rental period. The total value every site director stored in the memory 208 is held as it is within the memory 208 even after the end of rental period, and added at the time of next rental.

The execution program according to the rental service method having the above-described steps (S1 to S7, S21 to S25) may be recorded in a readable recording medium such as a flexible disk, or may be installed in other computers or the like for use.

As described above, according to the present embodiment, the operating time or the like of the construction machine 1 to be rented is obtained accurately and timely on the control PC 20 side. The point number calculated from the operating time or the like obtained is automatically presented. Accordingly, indirect expenses such as personnel expenses in the rental company are reduced and the fairness is secured to present the adequate service. Further, in order to obtain more points, the site director as the party using the construction machine also diligently stops the engine when the party understands that the point number is calculated by the operating time or the like. Therefore, the wasteful use of fuel is eliminated, and the warming of the earth can be also prevented because of suppressing a generating quantity of $CO_2$.

In the present invention, while an explanation has been made of the case of the group rental, it is noted that the rental company may purchase the construction machine 1 merely from the specific construction makers. In that case, with respect to the construction machine 1 of the specific construction machine makers, the specific model and specification are selected out of a plurality of models and specifications by the authorization of the site director.

Further, in the aforementioned embodiment, an explanation has been made of a case where the rental company owns the control PC 20. However, the PC 20 may be owned by affiliated companies of the rental company, construction machine makers or machine control companies.

Furthermore, in the above-described embodiment, the operating time or the like calculated from the signal output or the like of the key switch unit 10 of the construction machine 1 is once stored in the memory 124 and then transmitted to the PC 20. The operating time or the like may be directly transmitted without being stored in the memory 124. In that case, on the PC 20 side, the operating time or the like is obtained at almost real time. Further, alternatively, the signal output or the like of the key switch unit 10 of the construction machine 1 may be transmitted to the PC 20 without modification, and the operating time or the like may be calculated from information received on the PC 20 side. In that case, since blanket processing by on the PC 20 side is enabled, a simpler system constitution is obtained.

Further, in the above-described embodiment, while the operating time and the load ratio of the construction machine 1 are used as information for calculating the points, it is noted that all kinds of information such as the used time or the like of special specification. Further, they may be used singly or in combination for calculating the points. In that case, points adjusted to actual circumstances are calculated.

Further, in the above-described embodiment, the control PC 20 obtains the operating time or the like of the construction machine 1 through the satellite 30. It is not always necessary to obtain that through the satellite 30. For example, in a case where the construction machine 1 rented is returned to the original rental company, when the construction machine 1 having been returned passes through the in/out gate, the operating time or the like may be obtained through a simplified wireless radio or a portable terminal. Thereby, a simple system can be constituted. In this case, operating information of the construction machine 1 may be obtained by a self-statement of a renter or IC card, as mentioned previously, without using any communication means. Thereby, a simpler system can be constituted.

Further, in the above-described embodiment, while the load ratio is calculated from the ratio between the fuel consumption quantity calculated form the fuel sensor 26 and the fuel consumption quantity per time at the rated load measured in advance by the engine makers, the load ratio may be calculated in the following manner.

Figure 6:
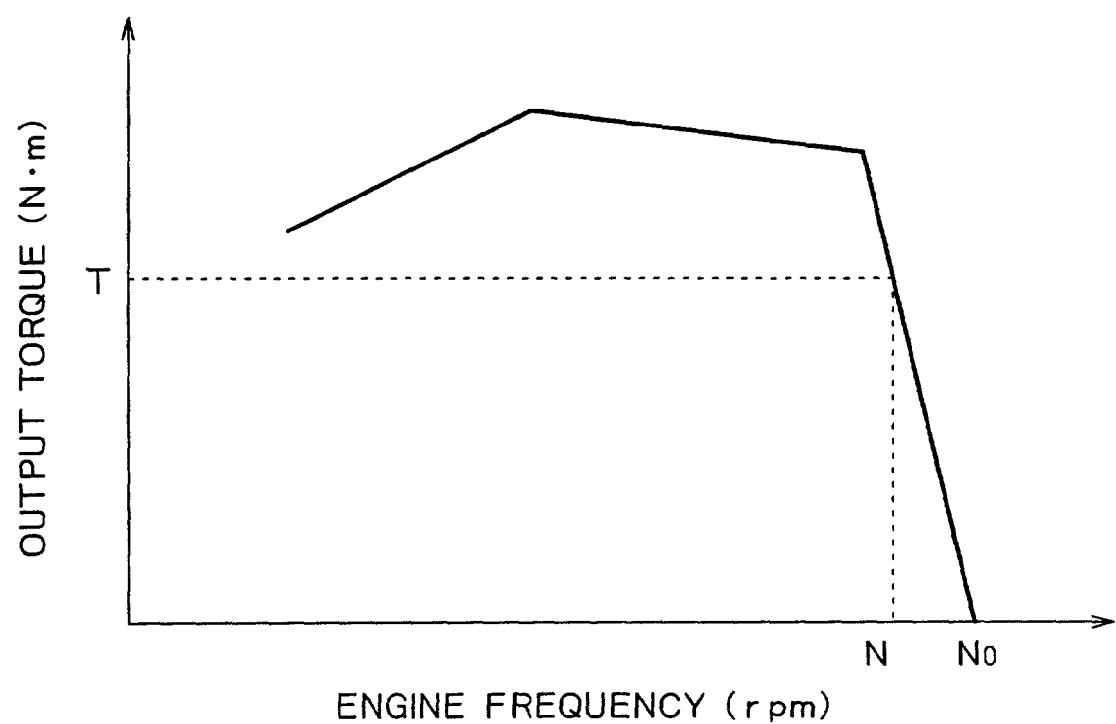
FIG. 6 is a diagram of engine frequency-engine output torque used in a method of calculating other load ratio.

For example, the non-load engine frequency $N_0$ is calculated from the indicated value of an accelerator potentiometer not shown installed on the construction machine 1, and the output torque T at the present actual engine frequency N is calculated from a diagram of engine frequency-engine output torque as shown in FIG. 6. The output horse power P can be calculated from the actual engine frequency and the output torque. That is, $P=2\pi N \times T/60$ results. The ratio between the output horse power P and the rated output horse power Pr measured in advance by the engine makers is the load ratio=P/Pr.

Further, in the above-described embodiment, since the consumption degree of the construction machine 1 is mainly increased or decreased due to the magnitude of the load ratio, for example, an average value within a predetermined period of the load ratio is used as the consumption degree. The maximum value or the minimum value of the load ratio may be used as the consumption degree. Further, the engine frequency may be considered in place of the load ratio or together with the load ratio. If both the ratio and the engine frequency are taken into consideration, more accurate consumption degree can be obtained.

Incidentally, the operating time or the like of the construction machine is normally obtained individually from the self-statement of the rental source or the IC card or the like set to the construction machine 1. In this case, since the operating time or the like of the construction machine is input in detail by a manual or the like on the apparatus side, the accurate operating time or the like is not sometimes obtained. Further, the construction machine rented is not always returned to the original rental company, but it is sometimes returned to the affiliated company located at a remote place.

So, there is constituted a rental service system comprising one or more of construction machines to be rented to one or more of renters and an information control apparatus communicable with each construction machine. Each construction machine is provided with a detector as detection means for detecting various operating information and transmission means for transmitting various operating information detected. The information control apparatus is provided with receiving means for receiving various operating information transmitted from various construction machines. Thereby, various operating information of various construction machines can be obtained accurately and timely on the information control apparatus, and can be used to present adequate service.

While one embodiment of the present invention has been disclosed in the foregoing, it is noted that the scope of protection of the present invention is not limited thereto.

We claim:

1. A method of renting a construction machine, comprising the steps of:
    renting one or more construction machines to one or more renters;
    collecting operating information of the one or more construction machines rented to the one or more renters, by information control means, wherein said operating information includes an operating time of the construction machine;
    calculating a point number related to a reduced consumption of the useful life of the construction machine by the operation of the construction machine by each renter, on the basis of an evaluation standard related to the consumption of the useful life of the construction machine and using said operating information collected by said information control means; and
    totaling and presenting said point number to each renter,
    wherein said evaluation standard is used to calculate the point number based on a value obtained by subtracting an actual operating time from a standard operating time only in a case where the actual operating time of the construction machine is less than the standard operating time.

2. A method of renting a construction machine according to claim 1,
    wherein said point number is adjusted according to a stock state of available construction machines for rent.

3. A method of renting a construction machine, comprising the steps of:
    renting one or more construction machines to one or more renters;
    collecting operating information of the one or more construction machines rented to the one or more renters, by information control means;
    calculating a point number for each renter on the basis of an evaluation standard, using said operating information collected by said information control means; and
    totaling and presenting said point number to each renter,
    wherein said operating information includes a load ratio of the construction machine, and wherein said evaluation standard is used to calculate the point number based on a value obtained by subtracting an actual load ratio from a standard load ratio only in a case where the actual load ratio is smaller than the standard load ratio.

4. A method of renting a construction machine, comprising the steps of:
    renting one or more construction machines to one or more renters;
    collecting operating information of the one or more construction machines rented to the one or more renters, by information control means;
    calculating a point number related to a reduced consumption of the useful life of the construction machine by the operation of the construction machine by each renter, on the basis of an evaluation standard related to the consumption of the useful life of the construction machine and using said operating information collected by said information control means; and
    totaling and presenting said point number to each renter,
    wherein said evaluation standard is used to calculate the point number based on a value obtained by subtracting an actual used time from a standard used time only in a case where the actual used time is less than the standard used time.

5. An apparatus for use in renting a construction machine, comprising:
    information control means for collecting operating information of one or more construction machines rented to one or more renters, said information control means having calculation means for calculating a point number related to a reduced consumption of the useful life of the construction machine by using said operating information collected by said information control means, wherein said point number is based on a value obtained by subtracting an actual operating time or load ratio from a standard operating time or load ratio only in a case where the actual operating time or load ratio of the construction machine is less than the standard operating time or load ratio, and
    presentation means for totaling and presenting said point number to each renter.

6. An apparatus for use in renting a construction machine according to claim 5,
    wherein said calculation means is provided with adjustment means for adjusting said point number according to stock state of available construction machines for rent.

7. A system for use in renting a construction machine, comprising:
    one or more construction machines to be rented to one or more renters, said construction machine having a detector for detecting operating information and transmission means for transmitting said detected operating information; and
    the apparatus of claim 5 communicable with said construction machine, said apparatus having a receiver for receiving said operating information transmitted from said one or more construction machines.

* * * * *